United States Patent

[11] 3,575,010

[72] Inventor Charles Parker Honeyman
 2564 Chittenden Road, San Juan Bautista, Calif. 95045
[21] Appl. No. 806,916
[22] Filed Mar. 13, 1969
[45] Patented Apr. 13, 1971

[54] ROTATING DIRECT CONTACT LIQUID REFRIGERANT FREEZER
 10 Claims, 13 Drawing Figs.
[52] U.S. Cl. .................................................. 62/375,
 62/85, 62/375, 62/381
[51] Int. Cl. .................................................. F25d 3/10,
 F25d 25/04
[50] Field of Search .......................................... 62/85, 64,
 374, 67, 381, 375; 99/198

[56] References Cited
UNITED STATES PATENTS
2,137,902 11/1938 Walter ............................ 62/64
2,502,527 4/1950 McFarlan ....................... 62/64
2,638,759 5/1953 Barris ............................. 62/64
2,751,762 6/1956 Colton ............................ 62/67
3,368,363 2/1968 Alaburda et al. .............. 62/64

Primary Examiner—William E. Wayner
Attorney—Mellin, Moore & Weissenberger

ABSTRACT: Disclosed herein is apparatus for freezing food by bringing it into direct contact with a liquid or vaporous refrigerant. The apparatus includes rotor means having apertures therethrough, a quantity of food or other product being deposited into an aperture and then being carried with the rotor means as it rotates. Through such rotation, the food is brought into direct contact with the liquid refrigerant. Meanwhile, the rotor means and other means associated therewith ensure that virtually no air enters the system, and virtually no liquid refrigerant, or vapor thereof, is lost from the system. The system is quite flexible and can be adapted to perform a variety of processes.

Patented April 13, 1971
3,575,010
5 Sheets-Sheet 1
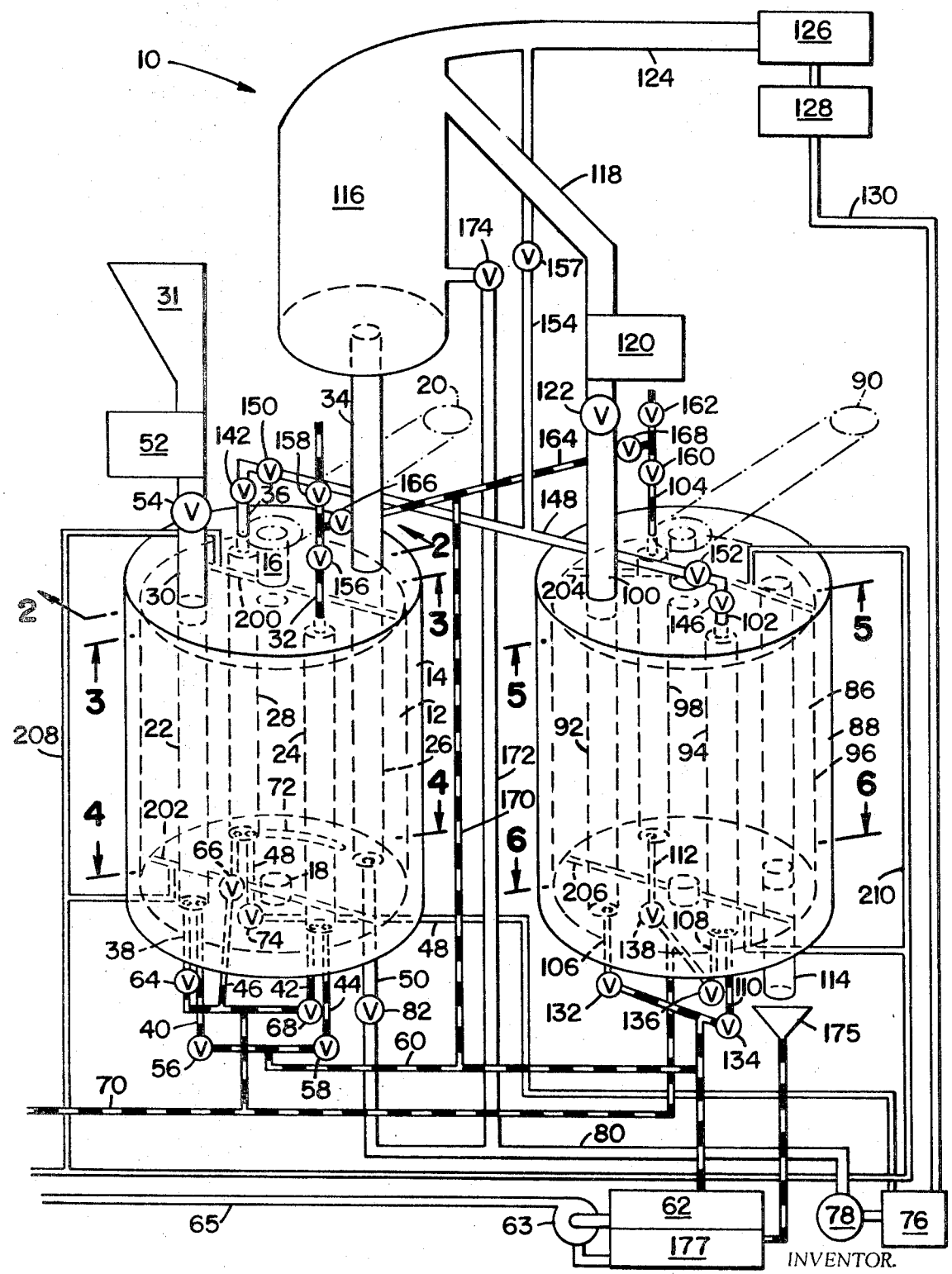
INVENTOR.
CHARLES PARKER HONEYMAN
BY
Mellin, Moore & Weisenberger
ATTORNEYS
FIG_1

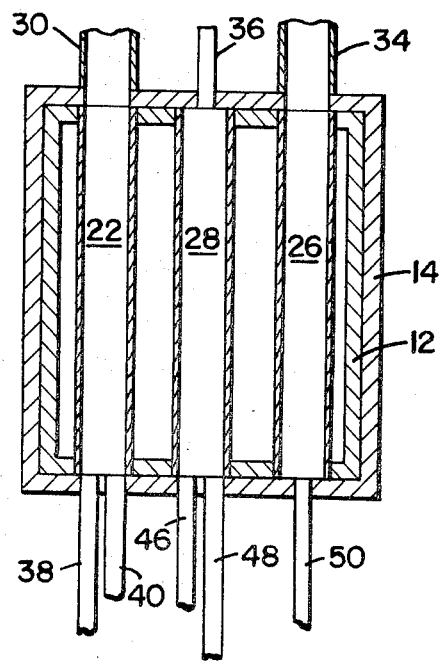
FIG_2
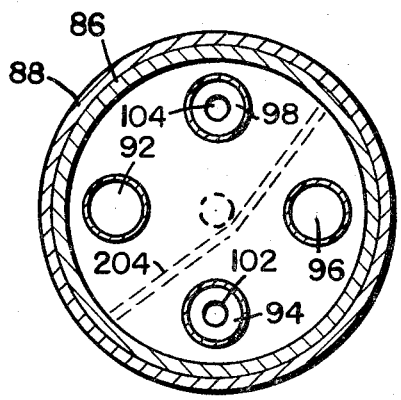
FIG_5
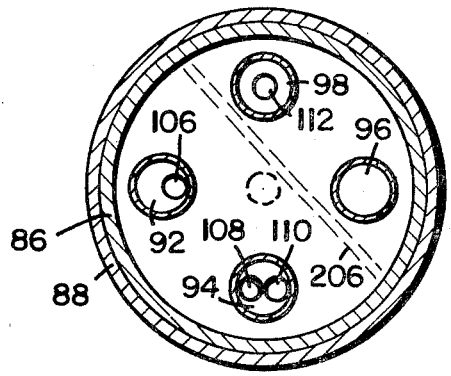
FIG_6
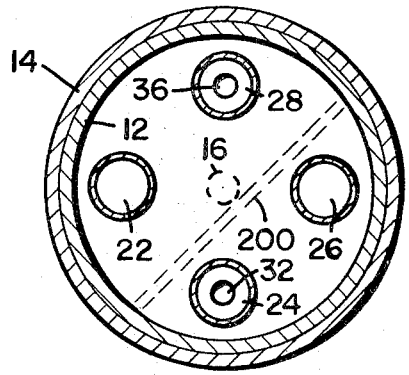
FIG_3
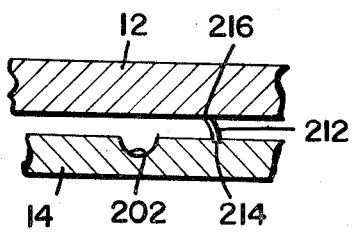
FIG_7
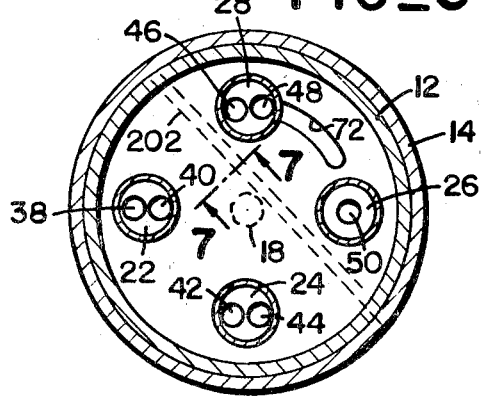
FIG_4
INVENTOR.
CHARLES PARKER HONEYMAN
BY
Mellin, Moore & Weissenberger
ATTORNEYS

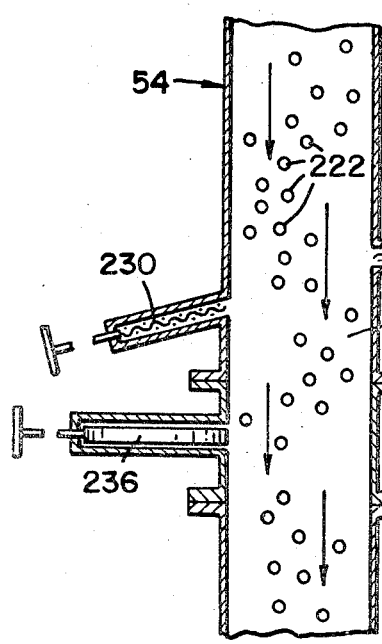
FIG_8
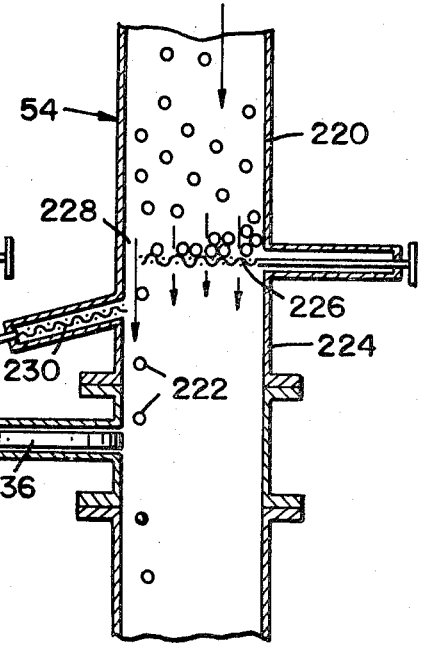
FIG_9
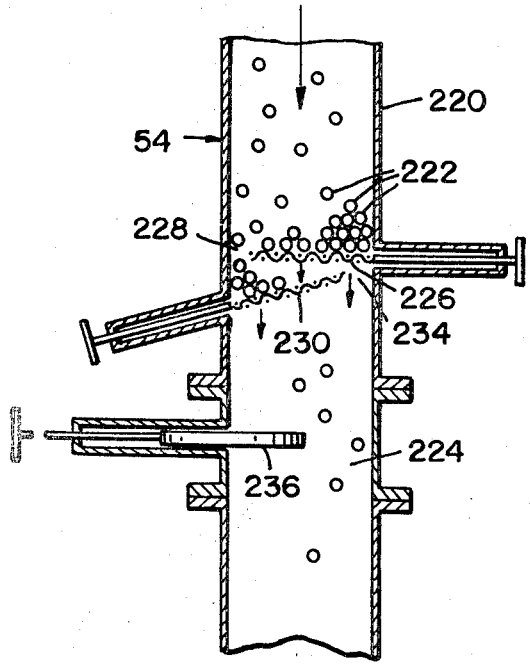
FIG_10
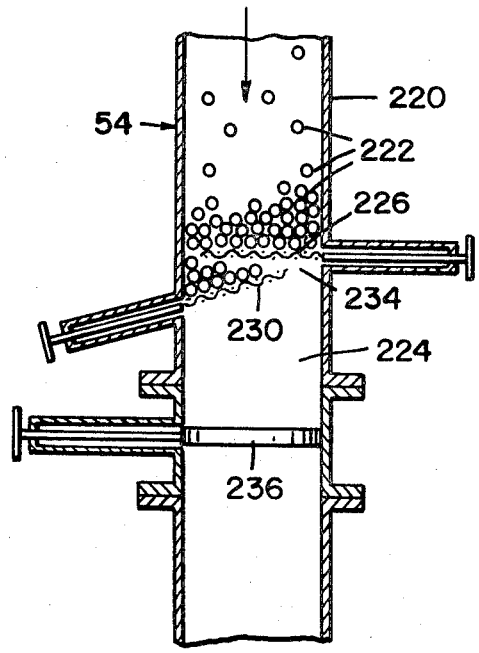
FIG_11

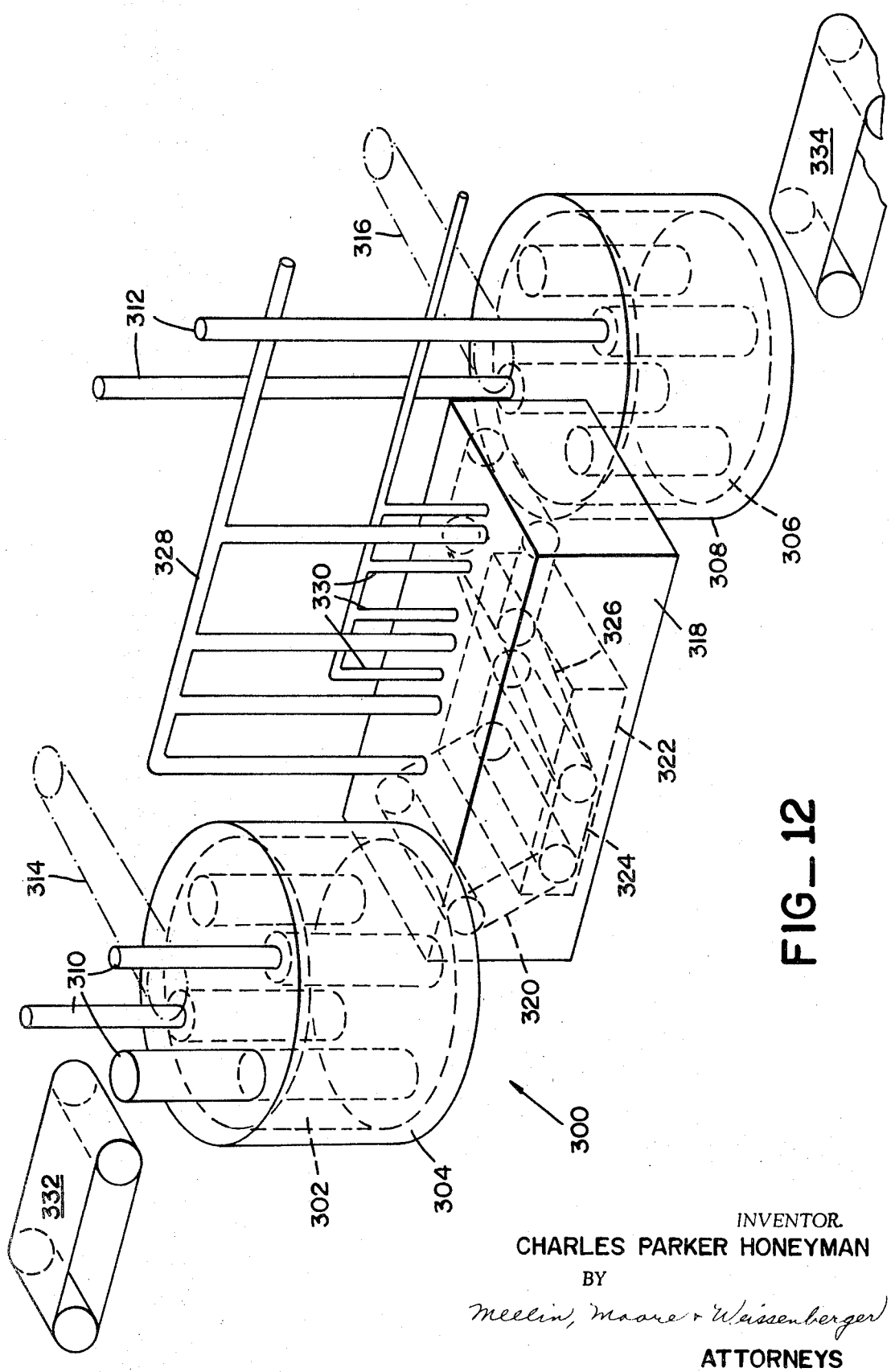
FIG_12
INVENTOR.
CHARLES PARKER HONEYMAN
ATTORNEYS

ROTATING DIRECT CONTACT LIQUID REFRIGERANT FREEZER

BACKGROUND OF THE INVENTION

Generally, freezing or cooling of a product by bringing it into direct contact with a liquid refrigerant is not widely used on a commercial scale. While attempts at commercially feasible systems have been made, no one system has ever been arrived at which overcomes the large number of problems involved, any one of which can render a system uneconomical and impractical to operate.

Among the major problems of prior systems are the contamination of the product by contaminants from the system, and contamination of the system by contaminants from the product. Other major problems are inadequate prevention of the loss of liquid or vapor refrigerant from the system, and inadequate prevention of the entering of air into the system. A system, to be commercially feasible, must overcome these problems. A system, to be commercially feasible, should also be as simple, inexpensive and efficient and flexible for use as possible, should be as compact as possible to utilize little floor space, adaptable to mobile usage, and should be easy to operate and clean. The system preferably should also be capable of operating continuously.

As stated above, known systems fail to overcome these problems so as to be commercially feasible.

It is therefore an object of this invention to provide a system for freezing or cooling a product by bringing it into direct contact with a liquid or vaporous refrigerant, which system provides (i) entirely adequate means for prevention of loss of liquid refrigerant, or vapor thereof, from the system, and (ii) entirely adequate means for preventing air from entering into the system and/or removing air from the system.

It is a further object of the invention to provide a system for freezing and/or cooling a product by bringing it into direct contact with a liquid refrigerant, which, while fulfilling the above object, provides (iii) means for preventing contamination of the product by contaminants within the system, and (iv) means for preventing contamination of the system by contaminants from the product.

It is a still further object of this invention to provide a system for freezing or cooling by bringing it into direct contact with a liquid refrigerant, which, while fulfilling the above objects, is extremely simple, relatively inexpensive and efficient to use and operate, is easy to clean, and is extremely compact.

It is a still further object of this invention to provide a system which, while fulfilling all the objects when used as a freezing or cooling system, is quite flexible in its use, and can be easily and conveniently adapted to perform a variety of functions on the product, meanwhile performing such functions in an effective, simple and efficient manner so as to be commercially feasible.

SUMMARY OF THE INVENTION

Broadly stated, the inventive apparatus for cooling food or other product comprises rotor means having a plurality of apertures therethrough, and stator means generally surrounding the rotor means. Means are included for rotating the rotor means relative to the stator means. Means are included for introducing a quantity of food or the like into one of the apertures in the rotor means, and means are included for purging substantially all of the air from that quantity of food after it has been carried further by the rotor means. Means are included for bringing liquid and/or vaporous refrigerant into direct contact with that quantity of food after it has been carried further by the rotor means.

BRIEF DESCRIPTION OF THE DRAWINGS

These and other objects of the invention will become apparent from a study of the following specification and drawings, in which:

FIG. 1 is a schematic drawing of an embodiment of the inventive apparatus;

FIG. 2 is a sectional view taken along the line 2–2 of FIG. 1;
FIG. 3 is a sectional view taken along the line 3–3 of FIG. 1;
FIG. 4 is a sectional view taken along the line 4–4 of FIG. 1;
FIG. 5 is a sectional view taken along the line 5–5 of FIG. 1;
FIG. 6 is a sectional view taken along the line 6–6 of FIG. 1;
FIG. 7 is a sectional view taken along the line 7–7 of FIG. 4;
FIGS. 8—11 are sectional views of the sequential operation of a valve of the device;
FIG. 12 is a schematic drawing of a second embodiment of the inventive apparatus.

DESCRIPTION OF THE PREFERRED EMBODIMENT

Figure 13:
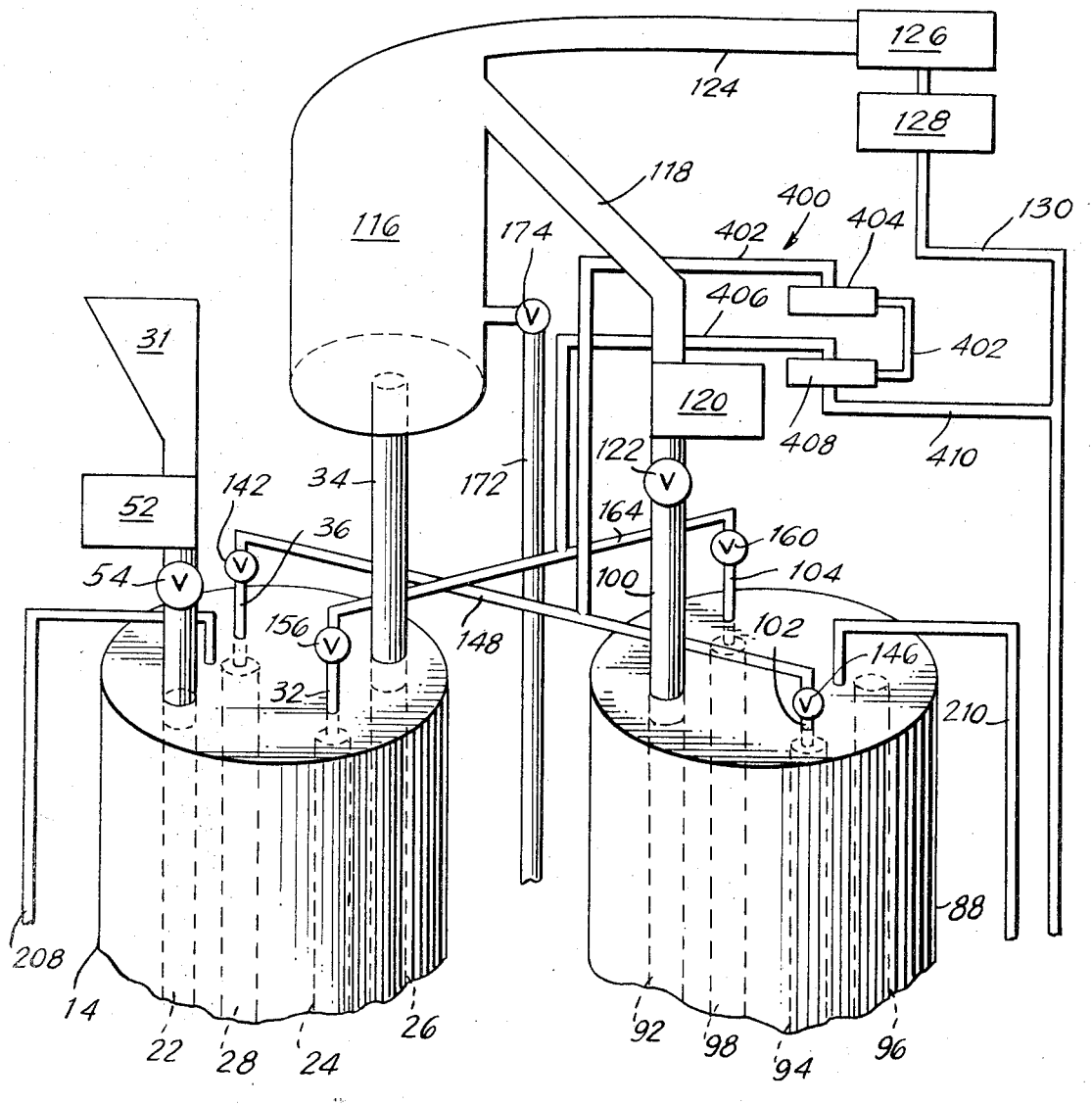
FIG. 13 is an alternative system for purging air and refrigerant from the system of FIG. 1.

Shown generally in FIG. 1 is an overall view of a preferred embodiment of the system 10. The system 10 includes a first rotor 12, generally cylindrical in configuration, and a first stator 14 surrounding the rotor 12. The construction of such rotor 12 and stator 14 is shown in FIGS. 1—4. As shown therein, rotor 12 has shafts, 16, 18 extending from opposite ends thereof along the axis of the cylinder, and through the stator 14, so that the rotor 12 may be rotated relative to the stator 14. Motor means 20 are provided for so rotating the rotor 12 relative to the stator 14. As shown in FIGS. 2—4, the rotor 12 and stator 14 are configured to provide only a minimum of clearance therebetween, sufficient for smooth rotation of the rotor 12.

Rotor 12 has defined therethrough four apertures 22, 24, 26, 28, equally spaced about the rotor 12. The top of the stator 14 has lines 30, 32, 34, 36 therethrough which communicate with the apertures 22, 24, 26, 28 when they are positioned under these lines.

Through the bottom of the stator 14 directly below line 30 are a pair of lines 38, 40. Also through the bottom of the stator 14, directly below line 32, are a pair of lines 42, 44. Directly below line 36, a pair of lines 46, 48 run through the bottom of the stator 14. A single line 50 runs through the bottom of the stator 14 directly below line 34.

Line 30 includes thereon an open end 31 into which product may be fed, a volumetric metering device 52, and a valve 54 for selectively stopping the flow of product effectively and without damage thereto. Such a valve 54 comprises part of the invention, and will be described further on in detail.

Lines 40 and 44 have valves 56, 58 respectively therein, and connect to a branch portion which in turn connects to a line 60 which runs to a sump 62, which in turn connects to a pump 63 adapted to feed into a line 65. Lines 38, 46, 42 have valves 64, 66, 68 respectively therein and connect to a branch portion, which in turn connects to a line 70.

Line 48 communicates with a semicircular groove or trough 72 in the bottom of the stator 14, and has a valve 74 therein. Line 48 runs down to a sump 76.

A pump 78 connects with sump 76 and has extending therefrom a line 80 which communicates with line 50, through valve 82.

The system 10 also includes a second rotor 86, generally cylindrical in configuration, and a second stator 88 surrounding the rotor 86 (FIGS. 1, 5 and 6). The rotor 86 is rotatable relative to the stator 88 by motor means 90, similar to the rotor 12.

Rotor 86 has defined therethrough four apertures 92, 94, 96, 98, equally spaced about the rotor 86. The top of stator 88 has lines 100, 102, 104 therethrough which communicate with the apertures 92, 94, 96, 98 when they are positioned under these lines.

Through the bottom of the stator 88, directly below line 100 is a line 106. Through the bottom of stator 88, directly below line 102, are lines 108, 110. A single line 112 runs through the bottom of the stator 88 directly below line 104. In addition, another line 114 runs through the bottom of the stator 88.

Line 34, associated with rotor 12, leads upward into the bottom of a chamber 116. Adjacent the top of the chamber 116 a line 118 leads downward to a volumetric metering device 120, which communicates with line 100 through a valve 122. At the top of chamber 116 is a line 124 which leads therefrom into a condenser 126, which in turn leads to a receiver 128. Interconnecting receiver 128 and sump 76 is a line 130.

Lines 106, 110 have valves 132, 134 therein respectively, and connect to a branch portion which in turn feeds into line 60. Lines 108, 112 have valves 136, 138 therein respectively, and connect to a branch portion which in turn feeds into line 70.

Line 32 has a pair of valves 156, 158 in series, and line 104 also has a pair of valves 160, 162 in series, valves 158, 162 being float valves. A line 164 runs from line 32 between valves 156, 158 to line 104 between valves 160, 162. The line 164 has valves 166, 168 therein. A line 170 runs downward from line 164 to line 60. A line 172, having a valve 174 therein, runs between chamber 116 and line 80.

Line 36 has a float valve 142 therein, and line 102 also has a float valve 146 therein. A line 148 runs from line 36 above valve 142 to line 102 above valve 146. The line 148 has valves 150, 152 therein. A line 154 runs upward from line 148 to line 124.

Lines 65 and 70 connect to a tank which holds purge liquid (not shown). These lines lead to and communicate with the lines as described above, and together therewith make up the purging system (shaded) of the apparatus. Sump 76 contains liquid refrigerant (which may, for example, be liquid R-12), as does pump 78, line 80, and chamber 116, the level of liquid refrigerant in chamber 116 being variable by the use of valve 174 in line 172. This apparatus, and the lines described above as associated therewith, make up the cooling or freezing system of the invention. In such system, the purge liquid, liquid refrigerant, and product to be frozen are, or course compatible.

In the operation of the system 10, the rotors 12, 86 are rotated slowly in a counterclockwise direction (FIG. 1) by their respective motor means 20, 90. As the rotors rotate, the apertures therethrough are, of course, moved slowly around therewith. As each aperture of rotor 12 cooperates with the rest of the apparatus in the same way, the operation of the system in cooperation with only one aperture of rotor 12 will be described. Similarly, the operation of the system in cooperation with only one aperture of rotor 86 will be described.

As aperture 22 of rotor 12 is in position to communicate with lines 30, 38 and 40, food or other material or product is fed into opening 31, through metering device 52, and through valve 54, through line 30, and into aperture 22. As it is desirable to include a small amount of purge fluid in aperture 22 with the product, but not enough to buoy the product, valve 64 may be opened. Purge liquid will then flow from line 70, which is a purge liquid supply line, up through line 38 and into aperture 22. If too much purge liquid is in pocket 22, so as to buoy the product, the product may be jammed as the rotor 12 turns. In this case valve 56 may be opened (with valve 64 closed), allowing purge liquid to drain from the aperture 22 through line 40 into drain line 60, and down into sump 62.

(It will be understood that screen material may be provided in various places throughout the system, so that this operation and the operations subsequently described may take place in proper fashion.)

Aperture 22 is then moved along to where it communicates with line 32 and lines 42 and 44. In order to displace any air which may be entrained with the product, valve 68 is opened (with valve 58 closed) to force purging liquid up through the aperture 22. During such purging, valve 156 is open, as is float valve 158, and valve 166 is closed. The air is pushed out through line 32, and when the purging liquid level is high enough therein, float valve 158 closes and valve 166 opens, allowing the overflow purging liquid to flow into line 164 and down line 170, into drain line 60.

The purging fluid in aperture 22 is then drained from the aperture 22 through drain line 44, leaving the product in a vacuum in aperture 22.

Aperture 22 is then moved along to where it communicates with lines 50 and 34. With valve 82 open, pump 78 supplies liquid refrigerant through lines 80, 50 into aperture 22. This liquid refrigerant is brought into direct contact with the product. If the liquid refrigerant is liquid R-12, and the product is food, the food has a lower specific gravity than the liquid R-12, and will float upward into the chamber 116. In the chamber 116, in direct contact with the liquid refrigerant, the product is frozen or cooled.

Aperture 22, containing liquid refrigerant, is then moved further along. The bottom of aperture 22 communicates with groove 72, and the liquid refrigerant in aperture 22 flows or is pumped therefrom through line 48, valve 74 being open. By the time the aperture 22 reaches the point where it communicates with lines 36, 46, virtually all of the liquid refrigerant has drained from the aperture, leaving only refrigerant vapor therein. At this point, with valve 74 closed and valves 66, 150, and float valve 142 open, purging liquid is pumped up through line 66, displacing the refrigerant vapor into line 148, and up into line 154 and back into the refrigeration system. It will be understood that line 36 may incorporate a purge liquid overflow system, similar to that associated with line 32.

When aperture 22 reaches the point where it communicates with lines 30, 38, 40, the level of purge liquid therein may be adjusted to proper height as previously described, and product may then enter. Such cycle may be repeated indefinitely.

As this cycle is repeated, product will gather within chamber 116, and build up until it starts to spill over and into line 118. During such building up, of course, the liquid refrigerant further acts on the product. As the product moves down line 118 under its own weight, it passes through volumetric metering device 120, valve 122, and line 100 and into aperture 92. Aperture 92 may contain excessive purge liquid when it is at this point, in which case valve 132 is opened, allowing purge liquid to flow downward through line 106 and into drain line 60. As in rotor 12, the purge liquid may be removed so as to lower the level thereof sufficiently so that the product is not buoyed up.

As the product comes down line 118, it carries some refrigerant vapor therewith down into aperture 92. As rotor 86 rotates, aperture 92, containing some purge liquid, product, and refrigerant vapor entrained therewith, is moved to a position where it communicates with lines 102, 108 and 110. Valve 136 is opened, with valve 134 being closed, and purge liquid is pumped up into aperture 92, with valve 152 and float valve 146 being open also. The refrigerant gas in aperture 92 is forced up into line 148, line 154, and back into the refrigeration system. Upon the level of the purge liquid reaching the float valve 146, such float valve closes, cutting off the flow. It will be understood that line 102 may incorporate a purge liquid overflow system, similar to line 32.

With valve 152 closed, valve 134 is opened so that purge liquid now in the aperture 92 may be drained or pumped therefrom through line 110, leaving the product in a vacuum. Upon continued rotation of rotor 86, aperture 92 reaches the point where it communicates with line 114, through which the product discharges onto a conveyor or the like. It will be understood that, if receiver 175 is set up to allow purge liquid to flow from the product into a sump 177, and back into the purging system, line 110 may be eliminated.

Aperture 92 now contains some air which entered when the product was discharged. Aperture 92 is then moved along to where it communicates with lines 104, 112. In order to displace the air in aperture 92, valve 138 is opened to force purging liquid up through aperture 92. During such purging, valve 160 is open, as is float valve 162, and valve 168 is closed. The air is pushed out through line 104, and when the purging liquid level is high enough, float valve 162 closes and valve 168 opens, allowing overflow purging liquid to flow into line 164 and down line 170, into drain line 60. When aperture 92 reaches the point where it again communicates with lines 100, 106, the cycle is repeated, and may be repeated, of course, indefinitely.

An alternative system 400 for purging air and refrigerant vapor from the system of FIG. 1 is shown in FIG. 13. Such system 400 eliminates the line 170 and the valves 158, 166, 162 and 168 from the air-purging system of FIG. 1. Instead, a line 402 runs upward from line 164 to a condenser 404, which internally maintains a lower pressure than the air pressure in aperture 22. When using this system, in order to purge air from aperture 22 when it is positioned below line 32, valve 156 is opened, permitting the (higher pressure) air in aperture 22 to escape through lines 32, 164 and 402 and into (lower pressure) condenser 404, thereby equalizing the pressure in aperture 22 and condenser 404. Aperture 92, when stationed below line 104, would be evacuated of air through the same process by opening valve 160 and permitting the escape of air through lines 104, 164, and 402 and into condenser 404, which is cooled with liquid nitrogen and liquid helium.

Such system 400 also eliminates line 154 and valves 150 and 152 of the refrigerant-purging system of FIG. 1. Instead, a line 406 runs from line 148 to a condenser 408, a line 410 runs from condenser 408 to line 130, and a line 412 runs between condensers 404 and 408.

When using this system 400, in order to purge refrigerant vapor from aperture 22 when it is positioned below line 36, valve 142 is opened, permitting refrigerant vapor to escape via lines 36, 148 and 406, and into condenser 408, which would be maintained at a temperature desirable for eliminating virtually all of the refrigerant vapor from aperture 22. The resulting liquid air from condenser 404 would be fed into condenser 408 through line 412, along with liquid nitrogen. In this way, the desired temperature (and thus the desired pressure) in the condenser 408 are maintained. From the condenser 408, the refrigerant enters line 130 through line 410.

Aperture 92, when stationed below line 102, would be evacuated of refrigerant vapor through the same process by opening valve 146 and permitting the escape of refrigerant vapor through lines 102, 148 and 406 into condenser 408, and through line 410.

It will be understood, of course, that many variations may be made in the system without departing from the principle thereof. For example, a chamber such as chamber 116 can be eliminated completely, the refrigeration of the product taking place only in the apertures themselves. The number of apertures, of course, can be varied. The entire operation could be confined to a single rotor, with perhaps eight or more apertures, with the refrigeration of the product taking place in the apertures of the rotor. Or a chamber such as chamber 116 could be used with only a single rotor instead of the pair of rotors as described. The specific gravity of the product could be greater than that of the liquid refrigerant, in which case the product would fall downward if placed therein. In such case, chamber 116 would be repositioned so that the product is fed thereinto near the top and floats downwardly therein.

The apertures in the rotors, it will be understood, may have various cross sections designed to properly fit the product therein, and may be tapered so as to provide smooth entrance and exit of the product and so as to permit expansion of the product when it freezes, without jamming. The product, it will be understood, may be in containers, and may or may not be in direct contact with the liquid refrigerant. The system, it will be seen, may be adapted to heat the product instead of cooling or freezing it.

More generally, various liquid or vaporous refrigerants may be used, and the valving and piping of the system may take various configurations. Various purging liquids may also be used; for example, water (if the product is above freezing temperature), an aqueous solution of propylene glycol, an aqueous solution of water and alcohol, and others. In certain instances, a purging system is not required: i.e., for example, when using refrigerants that are intended to be exhausted to atmosphere, in which a limited amount of air can enter the system, and in the case where liquids are to be cooled when such liquids are taken from a tank with no way for air to enter, and are discharged into a suction line.

The use of a chamber such as chamber 116 has particular advantages which should be pointed out. Such a processing chamber 116 is unique in that it is merely a hollow shell with few moving parts associated therewith. Such a chamber would be easy to clean and service. Under certain conditions, (for example, when the chamber must be of large size), some moving parts might be required on the inside thereof. Such moving parts could be easily reached, however, through a crawl or hand hole in the chamber. In any case, such a chamber could be easily cleaned and maintained.

It will be understood that, as of necessity, a small clearance exists between the rotors and their respective stators. Such clearances must exist for the rotors to rotate freely and smoothly. As liquid refrigerant may be quite expensive, it may be desirable to stop the loss of liquid refrigerant or refrigerant vapor through these clearances. The system 10 includes seal means for doing just that.

Such seal means include grooves or channels 200, 202, 204, 206 on the inside surfaces of the stators 14, 88, at the tops and bottoms thereof (FIGS. 1—7), one of which is shown in cross section in FIG. 7. Liquid or gas is forced into channels 200, 202, 204, 206 by piping 208, 210. Such liquid or gas in the channels 200, 202, 204, 206, acts as a barrier past which little or no liquid refrigerant and/or refrigerant vapor can be lost and little or no air can enter. If a liquid barrier is used, it may take the form of propylene glycol. The pressure applied to the liquid or gas may, of course, be varied for proper sealing, and valves may be included in the piping 208, 210. If further sealing is required, blades may be affixed to the stators adjacent these channels 200, 202, 204, 206, the pressure from the gas or fluid in the channels holding the blades against the rotors as they turn. In addition, these blades may be spring loaded, or hydraulically loaded. Such a blade 212 is shown in cooperation with channel 202 (FIG. 7). The blade 212 has one edge 214 fixed to the stator 14, and a free edge 216. Such blade 212 is positioned so that the pressure of the gas or liquid in the channel 202 forces it against the rotor 12. Such blade 212 therefore acts as a seal between rotor 12 and stator 14.

In some applications, it may be necessary, in addition to the channel and blades described, to include channels and blades running along in vertical walls of the stators and connecting the channels in the tops and bottoms of the stators. In some applications, it may be essential to extend the channels and blades so that they completely encircle the circumference of the rotors. In other applications, it may be possible to dispense with the channels and pressurized fluid completely, the blades being sufficient to provide effective sealing. In other applications, no sealing means at all may be deemed necessary.

As stated previously, valve 54 is a valve for selectively stopping the flow of product effectively and without damage thereto. Such a valve 54 is shown in FIGS. 8—11. The valve 54 is particularly useful in cutting off the flow of pieces of food flowing along with liquid, but is not limited to that use. The valve 54 includes a tubular body 220 through which food particles 222 and liquid 224 flow in a stream. Valve 54 includes a first screen member 226, the screen thereof being such as to allow liquid 224 to flow therethrough, but not food particles 222 (i.e., liquid-pervious but food or other particle-impervious). Screen member 226 is positioned out of the way of the stream and is adapted to be moved into the stream to define a gap 228 with the inner wall of the tubular body 220 large enough for food particles 222 to pass therethrough. Also included is a second screen member 230, which is, like screen member 226, liquid-pervious but food or other particle-impervious. Such screen member 230 is positioned to be moved into the stream on the downstream side of screen member 226 to cover gap 228 and is angled in an upstream direction so that the end thereof defines with the screen member 226 an opening 234 small enough so that food particles 222 cannot pass therethrough.

Valve 54 also includes a liquid and food particle-impervious disc or the like 236 on the downstream side of both screen members 226, 230. The disc 236 is adapted to move into the stream to completely close off the flow within the tubular body 220.

In the operation of such valve 54, the stream of food particles 222 and liquid 224 is flowing through the tubular body 220. If it is desired to cut off the flow of the stream, initially screen member 226 is moved into the stream (FIG. 9). This cuts off the flow of a great amount of food particles 222, but the liquid 224 flows on, and some food particles 222 pass through gap 228. Then, screen member 230 is moved into the stream (FIG. 10). Such screen member 230 covers the gap 228 and effectively cuts off the flow of food particles without damage thereto, since opening 234 is small enough to keep food particles 222 from passing therethrough.

However, because the screen members 226, 230 are liquid-pervious, the liquid 224 continues to flow on through the body 220. This flow of liquid carries the food particles downstream of the screen members 226, 230 past the disc 236 before it completely cuts off the flow. FIG. 10 shows the disc 236 moved partially into the stream, and food particles being swept therepast by the flow of liquid 224. The movement of disc 236 is timed so that it does not completely cut off the flow until all food particles 222 downstream of screen members 226, 230 are downstream of disc 236. The disc 236 is then moved to completely cut off the flow (FIG. 11).

It will be understood that the movements of various elements of the valve 54 may be timed differently, and that they may be automatically sequenced so that a single act by the operator, such as pressing a button (not shown), initiates the automatic sequence.

Shown generally in FIG. 12 is an overall view of another embodiment of the system 300. Such system includes a first rotor 302, surrounded by a first stator 304, and a second rotor 306 surrounded by a second stator 308. Both rotors 302, 306 have apertures therethrough, and both stators 304, 308 have lines 310, 312 which are communicable with the apertures in the rotors 302, 306. Means 314, 316 are included for rotating the rotors 302, 306 relative to the stators 304, 308.

The stators 304, 308 are sealingly fixed to a chamber 318 in such a manner that apertures of the rotors 302, 306 communicate with the inside of the chamber 318 when properly positioned. Inside the chamber 318 is a conveyor 320 which feeds downwardly into a bath 322 of liquid refrigerant. Conveyor 320 feeds onto conveyor 324 immersed in the bath 322, and conveyor 324 feeds onto upward conveyor 326. A suction line 328 communicates with the chamber 318 to pick up refrigerant vapor and carry it to a condenser (not shown). A number of spray lines 330 communicate with chamber 318 to spray liquid refrigerant down into chamber 318.

In the operation of this embodiment of the system, a quantity of food or the like (not shown) is carried by a conveyor 332 and introduced into one of the apertures of the rotor 302 when that aperture is in position to receive it. After that quantity of food has been carried within that aperture to a certain point by the rotor 302, it drops into the chamber 318 and onto conveyor 320, which conveys it downwardly into the bath 322, into direct contact with the liquid refrigerant. Conveyor 324 transports the quantity of food through the bath 322 and onto conveyor 326, which conveys it upwardly. That quantity of food then drops from the chamber 318 into an aperture of the rotor 306 after it has been processed in the chamber 318. After that quantity of food has been carried to a certain point within that aperture, it drops from rotor 306 down onto conveyor 334.

It will be understood, of course, that lines 310, 312 may cooperate with the rotors 302, 306 in the same manner as the lines described in the previous embodiment.

The system 300 may be operated in a continuous manner, similar to the previous embodiment. A variety of processes may take place within the chamber 318, depending on the design thereof. For example, it could be used as a freezer, cooler, cooker, blancher, or any other processing system, and could be set up as a closed system which incorporates two or more of these processes within it.

As still another embodiment, rotors may be used on top of one another to transfer material from one to the other by gravity.

As another alternative embodiment, each aperture of the first rotor may be square in cross section, and may be divided up into a plurality of subapertures by intersecting plates which run the length of that aperture. In such an embodiment, product to be frozen or cooled is initially disposed in boxes or packages, each of which closely conforms to the cross section of each subaperture. Each of the packages has a plurality of perforations, and a ram may be used to load these packages into the subapertures of the first rotor, whereupon the various operations previously described are performed on the packaged product, including bringing liquid R-12 into direct contact therewith. During such freezing, the plates which make up the subapertures prevent distortion of the package by the expansion of the product. The product may be unloaded from the rotor by means of a ram, and, in fact, loading and unloading may be tied in together, the product being loaded displacing the product processed during a previous cycle.

It will be understood that the package may not be perforated, and that a second rotor, with a ram associated therewith, may be included. In addition, the product may be processed in a separate chamber with subapertures made of plates, the product being forced into the chamber by a ram sealed from the atmosphere. Both rotors, of course, would include means for preventing air from entering the chamber, and for recovering all refrigerant liquid and/or vapor.

The size and design of the various possible embodiments of the system will vary, depending on many factors. For example, the thermal conductivity, latent heat, specific heat, ambient temperature, size and shape, and desired finishing temperature of the product may bring about many variations to the systems. Means may be included for the removal of hydrates and/or ice crystals that get carried from the freezing chamber into the lines. Such means may include an accumulator in the line, with sufficient distance allowed to permit deceleration of crystals. Or, a jet of warm vapor may be used to melt the hydrates. Means may also be included to prevent agglomeration of food particles in freezing. For example, the chamber could be of such size that when refrigerant comes into contact with the food, boiling of the refrigerant will cause activity of the product, preventing it from fusing as freezing takes place. In the event of such agglomeration, means for separating the food particles may be included. For example, such means may include vibration of the product, mechanical force, or a spray of deicing liquid.

In any case, most embodiments of the system are extremely flexible and compact, and in most embodiments is easy to clean and maintain. The system is extremely simple and efficient in design, and can be operated continuously. There can be neither contamination of the product by the system, nor contamination of the system by the product. Means are included for preventing air from entering the system, and means are included for allowing only a minuscule amount of refrigerant, whether liquid or vapor, from leaving the system.

These features ensure a system which is commercially feasible for use in a variety of processing functions.

I claim:
1. Apparatus for cooling material comprising:
   a. rotor means having a plurality of apertures therethrough;
   b. stator means generally surrounding the rotor means;
   c. means for rotating the rotor means relative to the stator means;
   d. means for introducing a quantity of material into one of the apertures in the rotor means;

e. means for purging substantially all of the air from that quantity of material after it has been carried to a certain point by the rotor means;

f. means for bringing liquid refrigerant and refrigerant vapor into direct contact with that quantity of material after it has been carried further by the rotor means;

g. means for removing the liquid refrigerant from that quantity of material after it has been carried still further by the rotor means; and h. means for removing substantially all of any refrigerant vapor which may be left with that quantity of material after the liquid refrigerant has been removed and that quantity of material has been carried still further by the rotor means.

2. Apparatus according to claim 1 wherein the means for purging the air from that quantity of material comprise means for surrounding that quantity of material with purge liquid, whereby that air is displaced.

3. Apparatus according to claim 1 wherein the means for purging the air from that quantity of material comprise line means for applying to that air a pressure lower than the pressure of that air, so that the air travels from that quantity of material through the line means.

4. Apparatus according to claim 1 wherein the means for removing the vapor from that quantity of material comprise means for surrounding that quantity of material with purge liquid, whereby the vapor is displaced.

5. Apparatus according to claim 1 wherein the means for removing the vapor from that quantity of material comprise line means for applying to that vapor a pressure lower than the pressure of that vapor, so that the vapor travels from that quantity of material through the line means.

6. Apparatus according to claim 1 wherein are included seal means between the stator means and rotor means generally surrounding those points where liquid refrigerant and refrigerant vapor are within the rotor means.

7. Apparatus according to claim 6 wherein the seal means comprise:

a. channel means in the stator means and adjacent the rotor means; and b. means for introducing pressurized fluid into the channel means, whereby a seal is formed between the rotor means and stator means.

8. Apparatus according to claim 7 wherein the seal means further comprise blade means having an edge fixed to the stator means adjacent the channel means and having a free edge which is forced against the rotor means under pressure of the pressurized fluid in the channel means in sealing relation thereto.

9. A closed-circuit apparatus for processing material comprising:

a. a first rotor having a plurality of apertures therethrough;

b. a first stator generally surrounding the first rotor;

c. means for rotating the first rotor relative to the first stator;

d. means for introducing a quantity of material into one of the apertures of the first rotor when that aperture is in a certain position relative to the first stator;

e. chamber means communicating with a portion of the first rotor and into which that quantity of material moves after it has been carried within that aperture of the first rotor to a certain point by the first rotor;

f. means for transporting that quantity of material through the chamber means;

g. means for processing that quantity of material as it passes through the chamber means;

h. a second rotor having a plurality of apertures therethrough, a portion of the second rotor communicating with the chamber means;

i. a second stator generally surrounding the second rotor;

j. means for rotating the second rotor relative to the second stator, that quantity of material dropping from the chamber means after it has been processed into an aperture of the second rotor; and k. means for removing the quantity of material from that aperture of the second rotor after it has been carried within that aperture of the second rotor to a certain point by the second rotor.

10. Apparatus according to claim 9 wherein the means for processing that quantity of material include means for freezing the material in direct contact therewith.